United States Patent [19]
Takashima et al.

[11] Patent Number: 5,955,726
[45] Date of Patent: Sep. 21, 1999

[54] SYSTEM FOR AUTOMATICALLY SENSING LIGHT IN A PREDETERMINED RANGE AND CORRECTING A METER LUMINANCE

[75] Inventors: Masaki Takashima; Keiji Horiba, both of Aichi-ken; Akihiro Sasaki, Anjo; Nobutomo Takagi, Okazaki; Tomonori Suzuki, Seto; Kazunori Sakai, Aichi-ken, all of Japan

[73] Assignees: Denso Corporation, Kariya; Toyota Jidosha Kabushiki Kaisha, Toyota, both of Japan

[21] Appl. No.: 08/857,503

[22] Filed: May 16, 1997

[30] Foreign Application Priority Data

May 16, 1996 [JP] Japan .................................. 8-121759
Feb. 19, 1997 [JP] Japan .................................. 9-035080

[51] Int. Cl.⁶ .................................................. H01J 40/14
[52] U.S. Cl. .............................. 250/214 R; 250/214 C; 327/514; 356/218
[58] Field of Search ........................ 250/214 R, 214 C; 327/514; 356/218

[56] References Cited

U.S. PATENT DOCUMENTS

| | | | |
|---|---|---|---|
| 4,306,807 | 12/1981 | Sakane et al. | 356/223 |
| 4,745,274 | 5/1988 | Muro | 250/214 R |
| 5,327,210 | 7/1994 | Okui et al. | 356/218 |
| 5,329,115 | 7/1994 | Lim | 327/514 |
| 5,434,430 | 7/1995 | Stewart | 250/559.24 |
| 5,585,623 | 12/1996 | Ohtomo et al. | 250/214 C |
| 5,693,934 | 12/1997 | Hohmoto et al. | 250/214 R |

FOREIGN PATENT DOCUMENTS

| | | |
|---|---|---|
| 2625977A1 | 4/1977 | Germany . |
| 3-249525 | 11/1991 | Japan . |
| 4-194626 | 7/1992 | Japan . |
| 6-344754 | 12/1994 | Japan . |
| 7-092086 | 4/1995 | Japan . |

*Primary Examiner*—Stephone Allen
*Attorney, Agent, or Firm*—Pillsbury Madison & Sutro LLP

[57] ABSTRACT

A light sensing apparatus for different control systems includes a photosensitive element which generates a light current depending on light incident thereto. A pre-circuit connected to the photosensitive element is operative for generating separate basic signals in response to the light current generated by the photosensitive element. Processing circuits connected to the pre-circuit are active simultaneously for converting the basic signals generated by the pre-circuit into conversion-resultant signals having different forms respectively. The conversion-resultant signals are outputted to the control systems respectively. At least one of the processing circuits may include an oscillation circuit which oscillates at a frequency depending on related one of the basic signals generated by the pre-circuit.

8 Claims, 6 Drawing Sheets

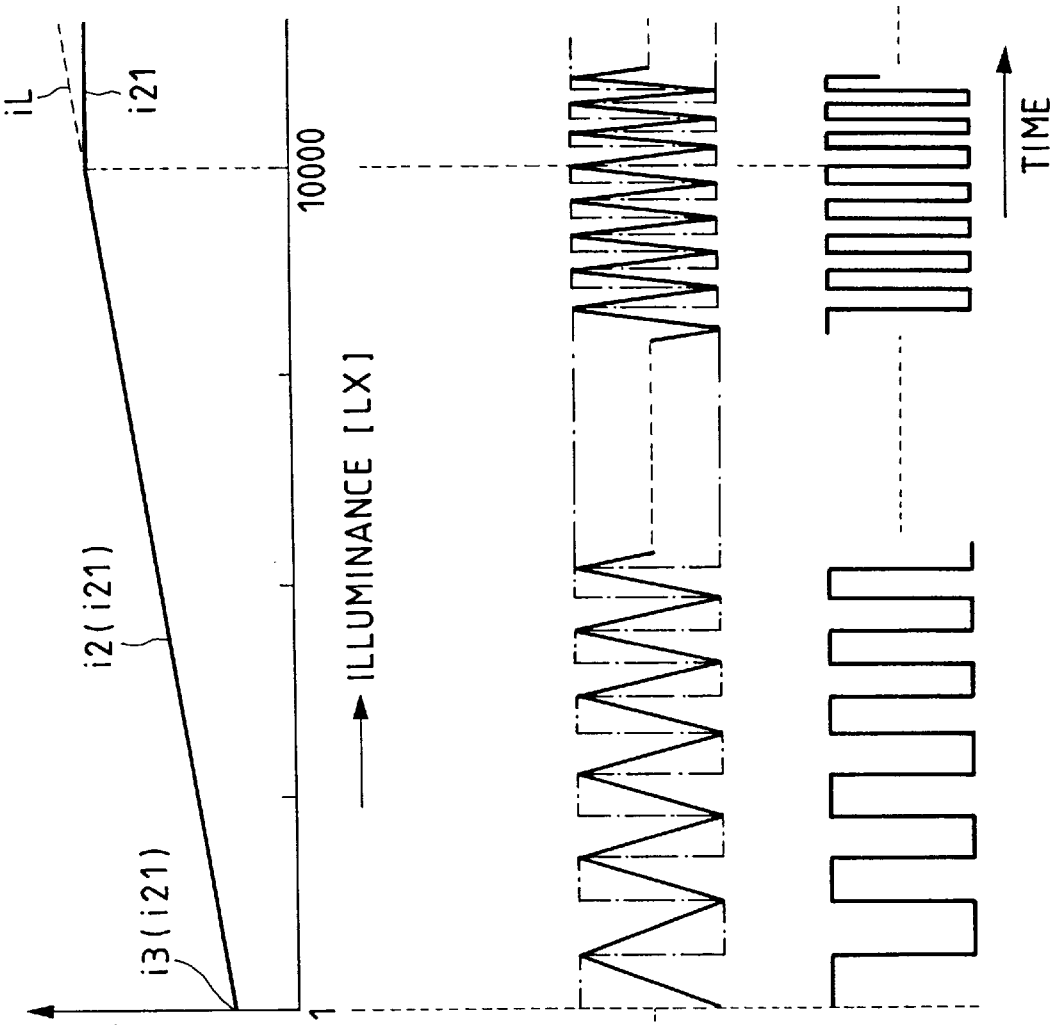

SYSTEM FOR AUTOMATICALLY SENSING LIGHT IN A PREDETERMINED RANGE AND CORRECTING A METER LUMINANCE

BACKGROUND OF THE INVENTION

1. Field of the Invention

This invention relates to a light sensing apparatus including a photosensor.

2. Description of the Related Art

Some automotive vehicles are equipped with lamp control systems which automatically activate and deactivate head lamps and tail lamps in response to the brightnesses of vehicles' surroundings. In general, such system are referred to as automatic light systems.

The automatic light system uses a light sensing apparatus which is designed to sense illuminances in a predetermined range including a level corresponding to a twilight or a semi-darkness. A typical example of the illuminance range which can be sensed by the light sensing apparatus in the automatic light system extends from 0 to 1,000 1x.

There is a known system for a vehicle which corrects a meter luminance or an indicator luminance in response to the brightness of vehicle's surroundings. The meter luminance correcting system uses a light sensing apparatus which is designed to sense illuminances in a predetermined range generally wider than the illuminance range related to the light sensing apparatus in the automatic light system. A typical example of the illuminance range which can be sensed by the light sensing apparatus in the meter luminance correcting system extends from 0 to 10,000 1x.

A known air-conditioning system for a vehicle includes a light sensing apparatus used as a sunshine sensing apparatus. In the air-conditioning system, the temperature of air discharged into a vehicle interior is controlled in response to the intensity of sunshine which is sensed by the sunshine sensing apparatus. A typical example of an illuminance range which can be sensed by the sunshine sensing apparatus in the air-conditioning system extends from 1,000 to 100,000 1x.

The light sensing apparatuses in the automatic light system, the meter luminance correcting system, and the air-conditioning system include photosensors such as photodiodes or phototransistors. The light sensing apparatuses also include processing circuits which operate on the output signals of the photosensors. The photosensors and the processing circuits are designed to provide suitable S/N ratios.

Japanese published unexamined patent application 4-194626 discloses a photosensor circuit which includes an operational amplifier following a photosensor. In the photosensor circuit of Japanese application 4-194626, the resistance of an amplification feedback resistor connected to the operational amplifier can be changed between a first value and a second value. The first resistance value provides a first input-output characteristic of the operational amplifier. The second resistance value provides a second input-output characteristic of the operational amplifier which differs from the first input-output characteristic thereof. The resistance of the amplification feedback resistor is automatically changed between the first value and the second value in response to a light-dependent current flowing through the photosensor, that is, an output signal of the photosensor. Accordingly, the resultant input-output characteristic line of the operational amplifier has a bend point. Japanese application 4-194626 discloses that portions of the resultant input-output characteristic line which extend on opposite sides of the bend point are suited for a photosensor in an automatic light system and a sunshine sensor in an air-conditioning system respectively.

Japanese published unexamined patent application 6-344754 discloses that an amplifier connected to a photosensor enlarges an output signal of the photosensor, and a resultant output signal of the amplifier is fed to both an air-conditioner controller and a light controller. Japanese application 6-344754 teaches that an air-conditioning system including the air-conditioner controller responds to the output signal of the amplifier. Also, Japanese application 6-344754 teaches that an automatic light system including the light controller responds to the output signal of the amplifier.

Japanese published unexamined patent application 3-249525 discloses a light measuring apparatus which includes a photodiode followed by two operational amplifiers having different input-output characteristics respectively. In the light measuring apparatus of Japanese application 3-249525, one of the operational amplifiers is activated while the other is deactivated. Thus, the amplification of an output signal of the photodiode can be changed between two different characteristics.

Japanese application 4-194626, Japanese application 6-344754, and Japanese application 3-249525 disclose that the output signal of a single photosensor is processed and used for multiple purposes. It tends to be difficult to provide adequate S/N ratios for all the purposes.

U.S. Pat. No. 5,434,430 corresponding to Japanese published unexamined patent application 7-92086 discloses an optical drop detector circuit for a thermal ink jet printer. The optical drop detect circuit of U.S. Pat. No. 5,434,430 includes an optical sensor for providing an electrical output indicative of a presence of an ink drop, a transconductance amplifier responsive to the output of said optical sensor, first and second cascaded bandpass amplifiers responsive to the transconductance amplifier, a first comparator circuit responsive to the output of the cascaded bandpass amplifiers for providing an output pursuant to optical sensing of a first minimum ink drop size, and a second comparator circuit responsive to the output of the cascaded bandpass amplifiers for providing an output pursuant to optical sensing of a second minimum ink drop size.

SUMMARY OF THE INVENTION

It is an object of this invention to provide an improved light sensing apparatus.

A first aspect of this invention provides a light sensing apparatus for different control systems which comprises a photosensitive element generating a light current depending on light incident thereto; a pre-circuit connected to the photosensitive element for generating separate basic signals in response to the light current generated by the photosensitive element; and processing circuits connected to the pre-circuit and being active simultaneously for converting said basic signals generated by the pre-circuit into conversion-resultant signals having different forms respectively, and for outputting the conversion-resultant signals to the control systems respectively.

A second aspect of this invention is based on the first aspect thereof, and provides a light sensing apparatus wherein at least one of the processing circuits comprises an oscillation circuit which oscillates at a frequency depending on related one of said basic signals generated by the pre-circuit.

A third aspect of this invention is based on the second aspect thereof, and provides a light sensing apparatus wherein said one of the processing circuits which comprises the oscillation circuit further comprises a bias circuit for providing related one of said conversion-resultant signals with a predetermined offset.

A fourth aspect of this invention is based on the second aspect thereof, and provides a light sensing apparatus wherein said one of the processing circuits which comprises the oscillation circuit further comprises a limiter circuit for clamping a condition of related one of said conversion-resultant signals when an illuminance related to said light is in a predetermined range.

A fifth aspect of this invention is based on the first aspect thereof, and provides a light sensing apparatus wherein said pre-circuit comprises a current mirror circuit.

A sixth aspect of this invention provides a light sensing apparatus comprising a photosensitive element generating a light current depending on light incident thereto; and an oscillation circuit connected to the photosensitive element for oscillation at a frequency depending on the light current generated by the photosensitive element, the oscillation circuit converting the light current into a frequency signal having a frequency depending on the light current.

A seventh aspect of this invention is based on the sixth aspect thereof, and provides a light sensing apparatus further comprising a bias circuit connected between the photosensitive element and the oscillation circuit for providing said frequency signal with a predetermined offset.

An eighth aspect of this invention is based on the sixth aspect thereof, and provides a light sensing apparatus further comprising a limiter circuit connected between the photosensitive element and the oscillation circuit for clamping the frequency of said frequency signal at a predetermined value when an illuminance related to said light is in a predetermined range.

BRIEF DESCRIPTION OF THE DRAWINGS

FIG. 3 is a time-domain diagram of a current, a voltage, and a signal in the light sensing apparatus of FIG. 1.

DESCRIPTION OF THE PREFERRED EMBODIMENTS

First Embodiment

Figure 1:
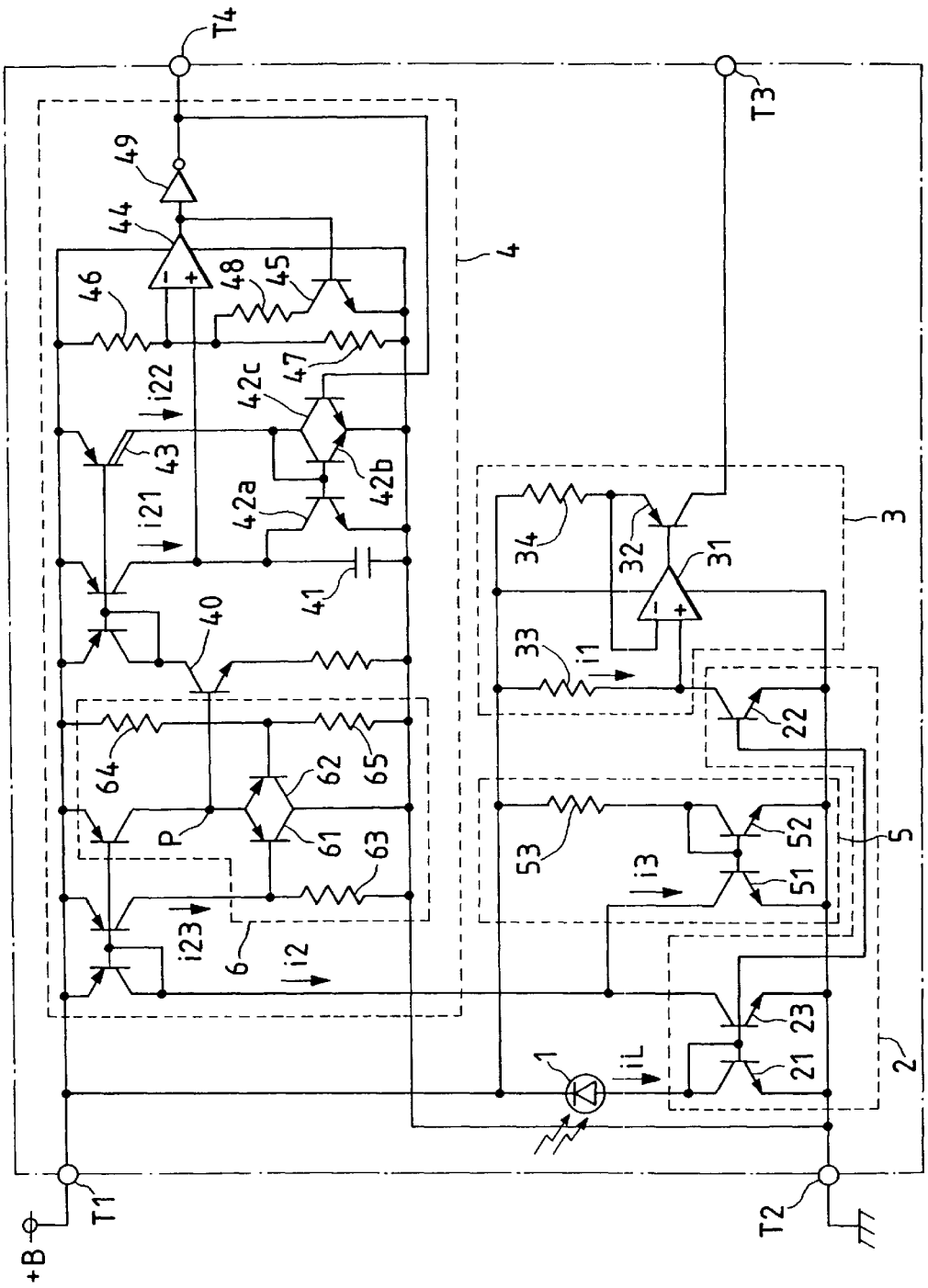
FIG. 1 is a schematic diagram of a light sensing apparatus according to a first embodiment of this invention.

With reference to FIG. 1, a light sensing apparatus includes a photosensitive element 1 such as a photodiode. The photosensitive element 1 is connected via a positive power supply terminal T1 and a ground terminal T2 to a dc power source so that a current iL depending on the illuminance related to light incident to the photosensitive element 1 flows therethrough. The current iL will be referred to as the light current hereinafter.

The light current iL flows from the photosensitive element 1 into a current mirror circuit 2 connected to the photosensitive element 1. The current mirror circuit 2 serves to generate currents i1 and i2 proportional to the light current iL.

The current mirror circuit 2 includes transistors 21, 22, and 23. The transistor 21 is connected between the photosensitive element 1 and the ground terminal T2. Specifically, the collector of the transistor 21 is connected to the photosensitive element 1. The bases of the transistors 21, 22, and 23 are connected in common to the photosensitive element 1. The emitters of the transistors 21, 22, and 23 are connected in common to the ground terminal T2. The currents i1 and i2, which are proportional to the light current iL, flow toward the collectors of the transistors 22 and 23 respectively.

A processing circuit 3 connected to the current mirror circuit 2 has a part through which the current i1 flows. The processing circuit 3 serves to process an illuminance signal represented by the current i1.

A processing circuit 4 connected to the current mirror circuit 2 has a part through which the current i2 flows. The processing circuit 4 serves to process an illuminance signal represented by the current i2.

The photosensitive element 1, the current mirror circuit 2, and the processing circuits 3 and 4 are fabricated and integrated on a common substrate. Thus, the photosensitive element 1, the current mirror circuit 2, the processing circuits 3 and 4, and the substrate compose a single semiconductor chip. The semiconductor chip has the positive power supply terminal T1, the ground terminal T2, and output terminals T3 and T4. The output terminals T3 and T4 are connected to the processing circuits 3 and 4 respectively. Output signals of the processing circuits 3 and 4 are transmitted to external control units via the output terminals T3 and T4 respectively.

The current mirror circuit 2 is a pre-circuit following the photosensitive element 1 and preceding the processing circuits 3 and 4.

The processing circuit 3 is designed to provide a current signal accurately representing an illuminance in a predetermined range, for example, 0 to 100,000 1x. The processing circuit 3 enables the photosensitive element 1 to be suitably used as a sunshine sensor for an air-conditioning system. It is preferable that the processing circuit 3 is designed to provide compatibility with a conventional sunshine sensor.

The processing circuit 3 includes an operational amplifier 31, a transistor 32, and resistors 33 and 34 which are connected to compose a current amplification circuit. The resistor 33 placed in an input side of the current amplification circuit is subjected to the current i1. A current signal proportional to the current iL flows through the emitter-collector path of the transistor 32 placed in an output side of the current amplification circuit. The collector of the transistor 32 is connected to the output terminal T3. The signal current flows through the output terminal T3. The signal current is an output current from the current amplification circuit. The output current Iout from the current amplification circuit in the processing circuit 3 is given as follows.

$$Iout = i1 \cdot (R1/R2)$$

where R1 and R2 denote the resistances of the resistors 33 and 34 respectively. Generally, the resistances R1 and R2 are adjusted so that the output current Iout will be accorded with or equivalent to an output signal of a sunshine sensor.

Figure 2:
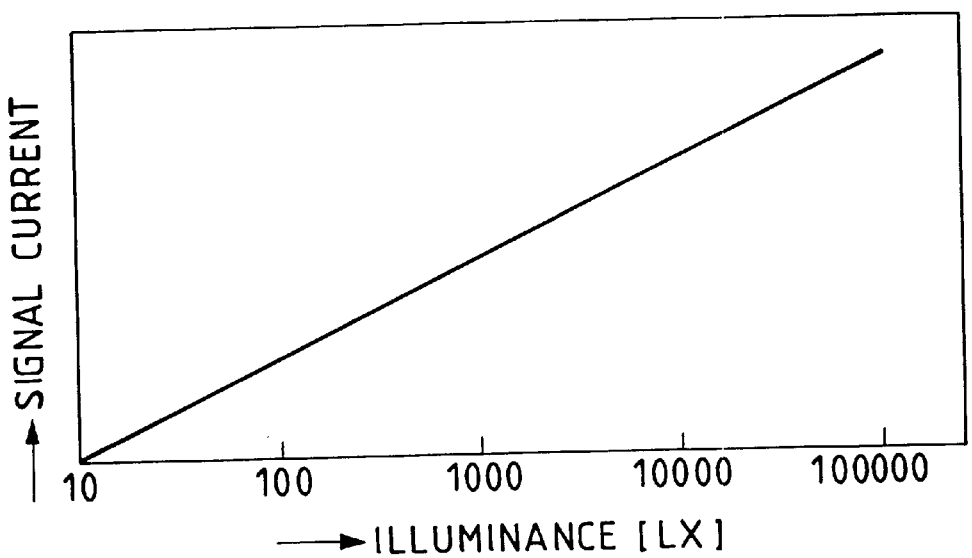
FIG. 2 is a diagram of the relation between a signal current and an illuminance in the light sensing apparatus of FIG. 1.

With reference to FIG. 2, the signal current or the output current Iout from the processing circuit 3 linearly varies with the illuminance in the range of 10 to 100,000 1x. This linearity means that a high S/N ratio is available throughout the illuminance range of 10 to 100,000 1x.

In FIG. 1, the processing circuit 4 is designed to provide a frequency signal accurately representing an illuminance in a predetermined range, for example, 0 to 10,000 1x. The processing circuit 4 enables the photosensitive element 1 to be suitably used as a photosensor for an automatic light system or a meter luminance correcting system.

The processing circuit 4 includes a current-to-frequency converter. An input side of the current-to-frequency converter is subjected to the current i2. The current-to-frequency converter generates and outputs a signal in response to the current i2. The output signal of the current-to-frequency converter has a frequency which varies in proportion to the magnitude of the current i2. The output side of the current-to-frequency converter is connected to the output terminal T4. Thus, the output frequency signal is transmitted via the output terminal T4.

Specifically, an input side of the processing circuit 4 is subjected to the current i2. The processing circuit 4 includes a capacitor 41, transistors 42a, 42b, 42c, and 43, and a comparator 44 which are connected to compose an oscillation circuit. The oscillation circuit oscillates at a frequency proportional to the magnitude of the current i2. As will be made clear later, the comparator 44 is provided with a hysteresis. The output terminal of the comparator 44 is connected via an inverter 49 to the output terminal T4 of the semiconductor chip. In the processing circuit 4, a stage preceding the oscillation circuit generates a current i21 proportional to the current i2. As will be made clear later, the capacitor 41 can be charged by the current i21. The transistors 42a, 42b, and 42c compose a switch for selectively discharging the capacitor 41 in response to the output signal of the inverter 49.

In the processing circuit 4, a non-inverting input terminal of the comparator 44 is subjected to a voltage across the capacitor 41. The oscillation circuit includes a series combination of resistors 46 and 47 which is connected across the dc power source. The junction between the resistors 46 and 47 is connected to an inverting input terminal of the comparator 44. Also, the oscillation circuit includes a series combination of a resistor 48 and a transistor 45 which is connected in parallel with the resistor 47. The transistor 45 serves to selectively connect and disconnect the resistor 48 in parallel to and from the resistor 47 in response to an output signal of the comparator 44. When the transistor 45 disconnects the resistor 48 from the resistor 47, the resistors 46 and 47 cooperate to apply a first predetermined threshold voltage Vref1 to the inverting input terminal of the comparator 44. When the transistor 45 connects the resistor 48 in parallel to the resistor 47, the resistors 46, 47, and 48 cooperate to apply a second predetermined threshold voltage Vref2 to the inverting input terminal of the comparator 44. The second predetermined threshold voltage Vref2 is lower than the first predetermined threshold voltage Vref1.

With reference to the portion (b) of FIG. 3, during a certain interval of time, the capacitor 41 remains charged by the current i21 so that the voltage across the capacitor 41 continues to rise. It should be noted that the current i21 is proportional to the current i2. When the voltage across the capacitor 41 reaches the first predetermined threshold voltage Vref1, the output signal of the comparator 44 changes from a low logic level to a high logic level. At the same time, as shown in the portion (c) of FIG. 3, the output signal of the inverter 49, which is transmitted via the output terminal T4 of the semiconductor chip, changes from a high logic level to a low logic level.

The change of the output signal of the comparator 44 to the high logic level causes the transistor 45 to fall into an on state so that the first predetermined threshold voltage Vref1 applied to the comparator 44 is replaced by the second predetermined threshold voltage Vref2. At the same time, the capacitor 41 starts to be discharged in response to the output signal of the inverter 49. In this case, the transistor 42a short-circuits the capacitor 41 in response to a great current i22 fed from the transistor 43, and hence the voltage across the capacitor 41 drops at a high rate.

When the voltage across the capacitor 41 drops below the second predetermined threshold voltage Vref2, the output signal of the comparator 44 changes from the high logic level to the low logic level. At the same time, as shown in the portion (c) of FIG. 3, the output signal of the inverter 49, which is transmitted via the output terminal T4 of the semiconductor chip, changes from the low logic level to the high logic level.

The change of the output signal of the comparator 44 to the low logic level causes the transistor 45 to fall into an off state so that the second predetermined threshold voltage Vref2 applied to the comparator 44 is replaced by the first predetermined threshold voltage Vref1. At the same time, the discharging of the capacitor 41 stops in response to the output signal of the inverter 49. Thus, the capacitor 41 starts to be charged by the current i21.

In this way, the output signal of the inverter 49, which is transmitted via the output terminal T4 of the semiconductor chip, periodically changes between the low logic level and the high logic level at a frequency depending on the current i21. Since the current i21 is proportional to the current i2, the frequency of the output signal of the inverter 49 depends on the current i2. The output signal of the inverter 49, that is, the output signal of the processing circuit 4, is of a binary form or a digital form.

With reference to the portions (a) and (b) of FIG. 3, as the current i2 (or the current i21) increases, the rate of the charging and discharging of the capacitor 41 increases and hence the frequency of the output signal of the inverter 49 (the output signal of the processing circuit 4) rises.

As understood from the previous explanation, the processing circuit 4 converts an analog current signal (the current i2) into a frequency signal of a digital form which is hardly affected by disturbance such as noise. Accordingly, the output signal of the processing circuit 4 is reliable and accurate.

With reference back to FIG. 1, a bias current circuit 5 is connected to the processing circuit 4 and the current mirror circuit 2. The bias current circuit 5 includes transistors 51 and 52, and a resistor 53. The bases of the transistors 51 and 52, and the collector of the transistor 52 are connected in common to one end of the resistor 53. The other end of the resistor 53 is connected to the positive power supply terminal T1. The emitters of the transistors 51 and 52 are connected in common to the ground terminal T2. The collector of the transistor 51 is connected to a point of a line along which the current i2 flows.

The current i2 is provided with a predetermined offset by a bias current i3 flowing into the collector of the transistor 51. As shown in the portion (a) of FIG. 3, the current i2 assumes a given positive value (a given non-zero value) equal to the bias current i3 when the illuminance at the photosensitive element 1 is approximately equal to zero. The current i2 linearly increases from the positive value i3 in accordance with an increase in the illuminance from about 0 to 10,000 1x. Therefore, the processing circuit 4 outputs a non-zero-frequency signal even when the illuminance at the photosensitive element 1 is approximately equal to zero. This is advantageous in deciding whether or not a signal line leading from the processing circuit 4 is broken by referring to the output signal of the processing circuit 4.

As shown in FIG. 1, the processing circuit 4 includes a limiter circuit 6. The limiter circuit 6 has transistors 61 and 62, and resistors 63, 64, and 65. The transistors 61 and 62 are connected to compose a comparator. The resistor 63 forms an input circuit followed by the comparator. The resistors 64 and 65 are connected in series to form a voltage dividing circuit. The junction between the resistors 64 and 65 is connected to the comparator. The series combination of the resistors 64 and 65 are connected across the dc power source. The resistors 64 and 65 cooperate to apply a predetermined reference voltage to the comparator. The output terminal of the comparator, that is, a circuit point P within the limiter circuit 6 is connected to the base of a transistor 40 located outside the limiter circuit 6. The transistor 40 is followed by a current mirror circuit (no reference character) for generating the previously-indicated currents i21 and i22.

A current i23 proportional to the current i2 is generated by a current mirror circuit (no reference character). The current i23 flows from the current mirror circuit into the resistor 63 within the limiter circuit 6. When the voltage across the resistor 63, which is proportional to the magnitude of the current i23, exceeds the predetermined reference voltage, the output signal of the comparator in the limiter circuit 6 (the voltage at the circuit point P) is in a high logic level state so that the transistor 40 is in an on stage. Therefore, in this case, the current i21 is clamped at a predetermined upper limit. Specifically, the upper limit of the current i21 depends on the predetermined reference voltage to the comparator within the limiter circuit 6. The upper limit of the current i21 can be adjusted according to the resistances of the resistors 64 and 65.

In the case where the output signal of the processing circuit 4 is used by only an automatic light system, it is preferable that the upper limit of the current i21 corresponds to slightly greater than an illuminance of 2,000 1x. In the case where the output signal of the processing circuit 4 is used by both an automatic light system and a meter luminance correcting system, it is preferable that the upper limit of the current i21 corresponds to an illuminance of about 10,000 1x.

As shown in the portions (a) and (c) of FIG. 3, when the current i21 reaches its upper limit, the frequency of the output signal of the processing circuit 4 reaches its upper limit. As shown in the portion (a) of FIG. 3, in the case where the upper limit of the current i21 corresponds to an illuminance of about 10,000 1x, the current i21 remains equal to its upper limit when the illuminance at the photosensitive element 1 is equal to or greater than about 10,000 1x. Also, as shown in the portion (c) of FIG. 3, the frequency of the output signal of the processing circuit 4 remains equal to its upper limit when the illuminance at the photosensitive element 1 is equal to or greater than about 10,000 1x. This frequency saturation is advantageous in preventing the occurrence of wrong operation of an automatic light system or a meter luminance correcting system due to an excessively high frequency of the output signal of the processing circuit 4.

Figure 4:
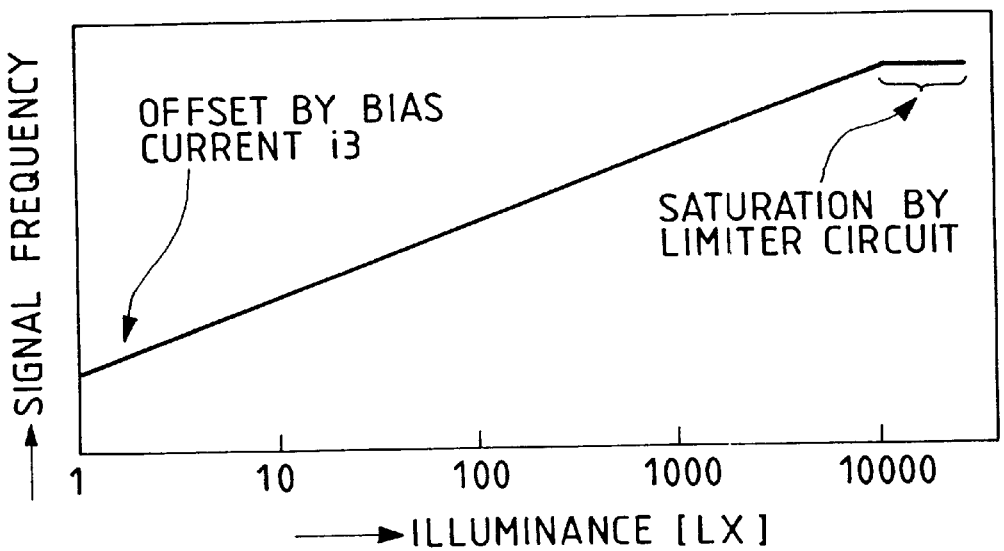
FIG. 4 is a diagram of the relation between a signal frequency and an illuminance in the light sensing apparatus of FIG. 1.

With reference to FIG. 4, the frequency of the output signal of the processing circuit 4 rises in proportion to the illuminance at the photosensitive element 1 in the range equal to or less than about 10,000 1x. Even in the absence of light incident to the photosensitive element 1, the output signal of the processing circuit 4 has a predetermined non-zero frequency (a predetermined offset frequency) corresponding to the previously-indicated bias current i3. The predetermined non-zero frequency is provided by the bias current circuit 5. The frequency of the output signal of the processing circuit 4 remains equal to its upper limit when the illuminance at the photosensitive element 1 exceeds about 10,000 1x. This frequency saturation is provided by the limiter circuit 6.

As understood from the previous explanation, the current mirror circuit 2 serves to generate the signal currents i1 and i2 in response to the light current iL. The signal currents i1 and i2 are proportional to the light current iL. The signal currents i1 and i2 are separate from each other. The signal currents i1 and i2 are processed by the processing circuits 3 and 4 respectively. The separation between the signal currents i1 and i2 ensures that adequate S/N ratios are available regarding both the output signals of the processing circuits 3 and 4. The current mirror circuit 2 makes it possible to easily provide the signal currents i1 and i2 proportional to the light current iL.

As previously explained, compatibility with a conventional sunshine sensor can be provided by the processing circuit 3. This is an advantage of the light sensing apparatus of FIG. 1.

The processing circuit 4 outputs the frequency signal which is hardly affected by disturbance such as noise. Therefore, the output signal of the processing circuit 4 is accurate and reliable.

As previously explained, the processing circuit 4 outputs a non-zero-frequency signal even when the illuminance at the photosensitive element 1 is approximately equal to zero. This is advantageous in deciding whether or not a signal line leading from the processing circuit 4 is broken by referring to the output signal of the processing circuit 4.

The limiter circuit 6 provides the upper limit on the frequency of the output signal of the processing circuit 4. This is advantageous in preventing the occurrence of wrong operation of an automatic light system or a meter luminance correcting system due to an excessively high frequency of the output signal of the processing circuit 4.

Second Embodiment

Figure 5:
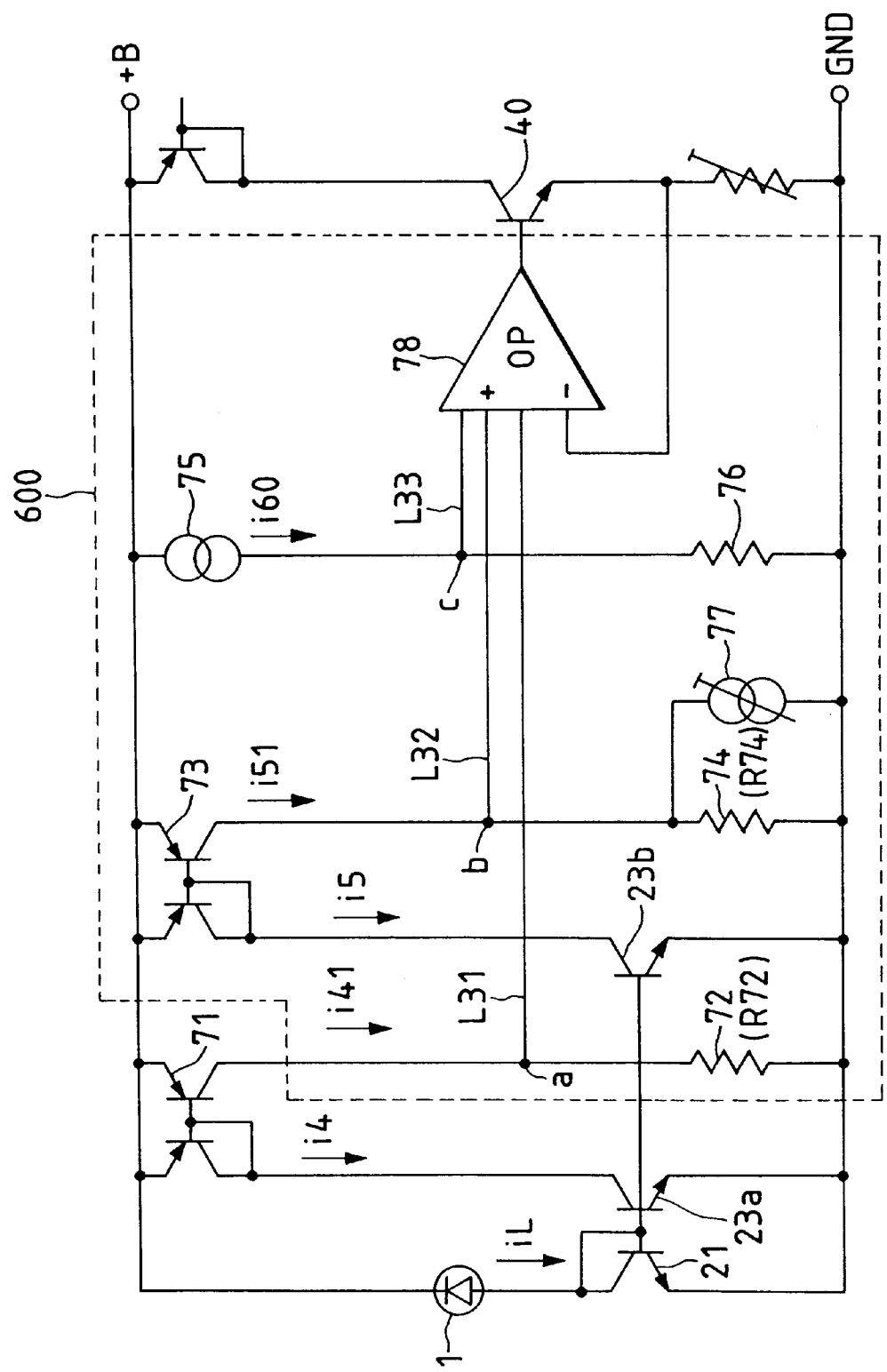
FIG. 5 is a schematic diagram of a portion of a light sensing apparatus according to a second embodiment of this invention.

FIG. 5 shows a portion of a second embodiment of this invention which is similar to the embodiment of FIG. 1 except for design changes indicated later. The second embodiment in FIG. 5 includes a processor 600 instead of the limiter circuit 6 (see FIG. 1). In addition, the transistor 23 in the current mirror circuit 2 (see FIG. 1) is replaced by transistors 23a and 23b. Currents i4 and i5 proportional to the light current iL flow into the collectors of the transistors 23a and 23b respectively.

With reference to FIG. 5, a current mirror circuit connected to the transistor 23a and including a transistor 71 generates a current i41 proportional to the current i4. The transistor 71 and a resistor 72 are connected in series. The series combination of the transistor 71 and the resistor 72 is connected across the dc power source.

A current mirror circuit connected to the transistor 23b and including a transistor 73 generates a current i51 proportional to the current i5. The transistor 73 and a resistor 74 are connected in series. The series combination of the transistor 73 and the resistor 74 is connected across the dc power source. A constant-current circuit 77 is connected across the resistor 74. The transistor 73, the resistor 74, and the constant-current circuit 77 are contained in the processor 600. The resistance of the resistor 74 is smaller than the resistance of the resistor 72.

The processor 600 includes a constant-current circuit 75 and a resistor 76 which are connected in series. The series combination of the constant-current circuit 75 and the resistor 76 is connected across the dc power source.

The processor 600 also includes an operational amplifier 78 having three non-inverting input terminals. A first non-inverting input terminal of the operational amplifier 78 is connected to the junction "a" between the transistor 71 and the resistor 72. A second non-inverting input terminal of the operational amplifier 78 is connected to the junction "b" between the transistor 73 and the resistor 74. A third non-inverting input terminal of the operational amplifier 78 is connected to the junction "c" between the constant-current circuit 75 and the resistor 76. The operational amplifier 78 selects the lowest voltage from among the voltages at the junctions "a", "b", and "c", and outputs the selected lowest voltage to the base of the transistor 40 following the processor 600.

As previously explained, the current i4 is proportional to the light current iL. The current i41 is proportional to the current i4. The current i41 flows through the resistor 72. The voltage across the resistor 72, which is proportional to the magnitude of the current i41, is inputted into the operational amplifier 78 via the junction "a".

As previously explained, the current i5 is proportional to the light current iL. The current i51 is proportional to the current i5. The current i51 flows through the resistor 74. An additional current provided by the constant-current source 77 also flows through the resistor 74. The voltage across the resistor 74, which is proportional to the magnitude of the sum of the current i51 and the additional current, is inputted into the operational amplifier 78 via the junction "b".

The constant-current circuit 75 generates a constant current i60. The constant current i60 flows through the resistor 76. The voltage across the resistor 76, which is proportional to the magnitude of the constant current i60, is inputted into the operational amplifier 78 via the junction "c".

Figure 6:
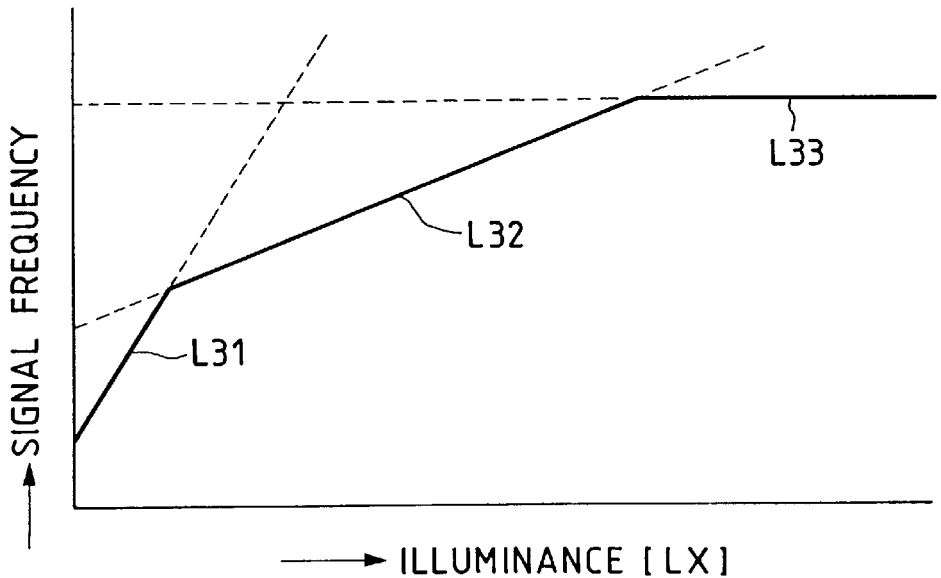
FIG. 6 is a diagram of the relation between a signal frequency and an illuminance in the light sensing apparatus of FIG. 5.

The current i41 provides an illuminance-frequency characteristic line L31 in FIG. 6. The current i51 provides an illuminance-frequency characteristic line L32 in FIG. 6. The constant current i60 provides an illuminance-frequency characteristic line L33 in FIG. 6. The slope of the illuminance-frequency characteristic line L31 depends on the resistance of the resistor 72. The slope of the illuminance-frequency characteristic line L32 depends on the resistance of the resistor 74. Since the resistance of the resistor 72 is greater than the resistance of the resistor 74, the slope of the illuminance-frequency characteristic line L31 is steeper than the slope of the illuminance-frequency characteristic line L32.

The operational amplifier 78 selects the lowest voltage from among the voltages at the junctions "a", "b", and "c" which correspond to the illuminance-frequency characteristic lines L31, L32, and L33 respectively. The operational amplifier 78 outputs the selected lowest voltage to the base of the transistor 40 following the processor 600. As shown in FIG. 6, a resultant illuminance-frequency characteristic agrees with a combination of the solid portions of the illuminance-frequency characteristic lines L31, L32, and L33.

Figure 7:
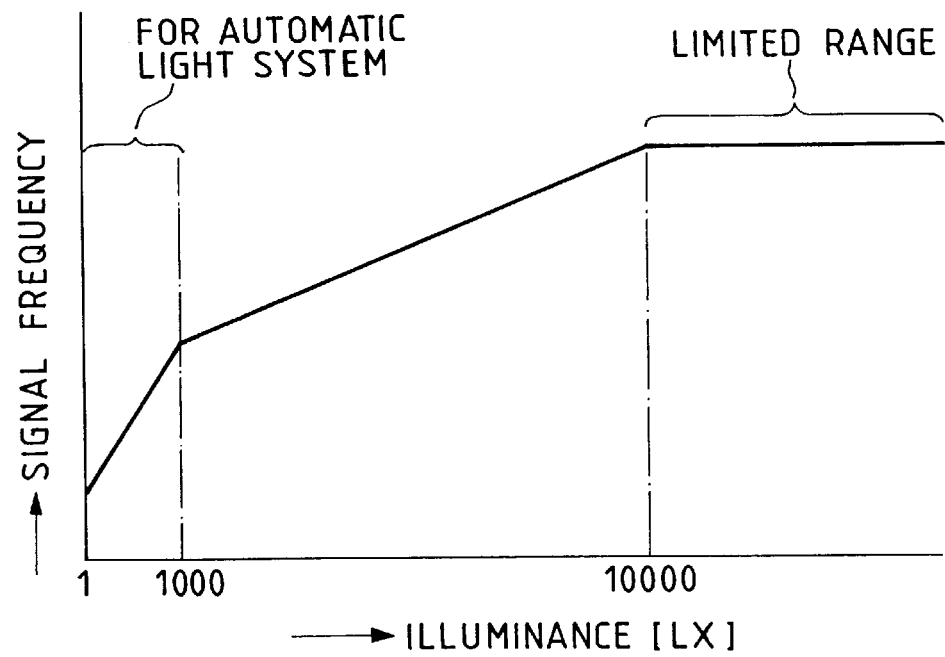
FIG. 7 is a diagram of the relation between a signal frequency and an illuminance in the light sensing apparatus of FIG. 5.

With reference to FIG. 7, an available signal frequency increases at a steep slope as the illuminance at the photosensitive element 1 increases from about zero to a first boundary point equal to about 1,000 1x. The relation between the signal frequency and the illuminance in this range is provided by the illuminance-frequency characteristic line L31. This illuminance range is designed for an automatic light system. The steep slope of the frequency increase provides a higher accuracy of the signal frequency. The available signal frequency increases at a gentle slope as the illuminance at the photosensitive element 1 increases from the first boundary point to a second boundary point equal to about 10,000 1x. The relation between the signal frequency and the illuminance in this range is provided by the illuminance-frequency characteristic line L32. The available signal frequency remains equal to its upper limit as the illuminance at the photosensitive element 1 exceeds the second boundary point. The relation between the signal frequency and the illuminance in this range is provided by the illuminance-frequency characteristic line L33.

Third Embodiment

Figure 8:
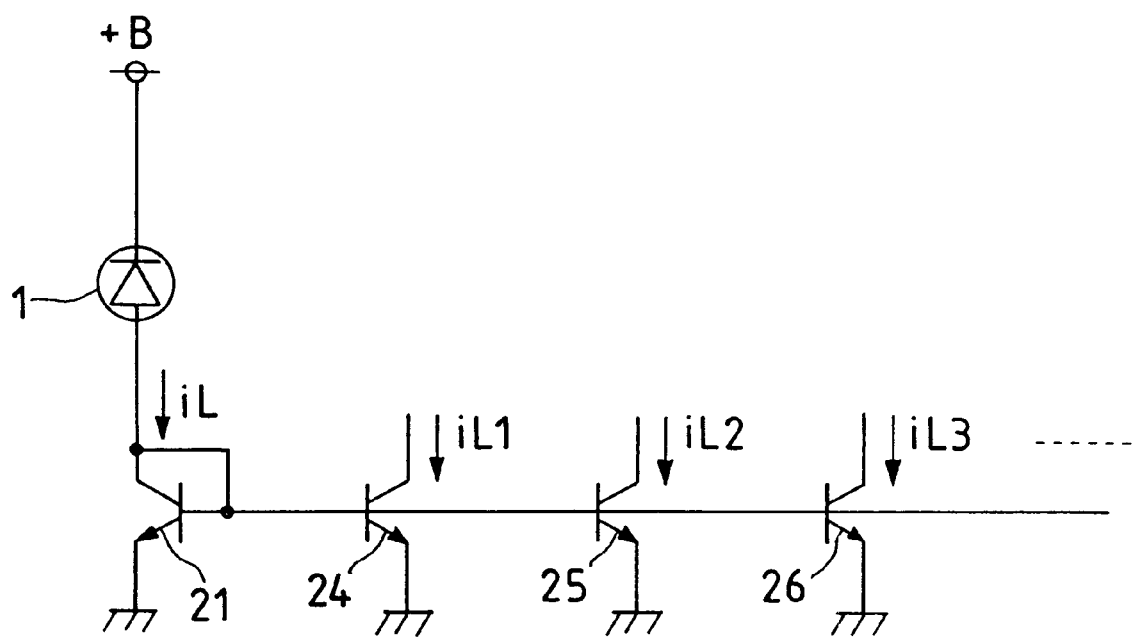
FIG. 8 is a schematic diagram of a portion of a light sensing apparatus according to a third embodiment of this invention.

FIG. 8 shows a portion of a third embodiment of this invention which is similar to the embodiment of FIG. 1 or the embodiment of FIG. 5 except for design changes indicated later.

In the embodiment of FIG. 8, a current mirror circuit connected to the photosensitive element 1 includes the transistor 21 and at least three transistors 24, 25, and 26. The transistors 21, 24, 25, and 26 are connected so that currents iL1, iL2, and iL3 proportional to the light current iL will flow into the collectors of the transistors 24, 25, and 26 respectively. Signals represented by the currents iL1, iL2, and iL3 are processed by processing circuits for different purposes respectively.

Other Embodiments

At least one of the processing circuits 3 and 4 in the embodiments of FIGS. 1 and 5 may be replaced by a processing circuit for a sun direction detecting sunshine sensor which outputs a plurality of current signals, a processing circuit designed to output a voltage signal, or a processing circuit for connection with an intra-vehicle LAN (local area network) which outputs serial data.

The current mirror circuits in the embodiments of FIGS. 1, 5, and 8 may be replaced by circuits which generate current signals or voltage signals having proportional relations with the light current iL.

What is claimed is:

1. A light sensing apparatus for different control systems comprising:

a photosensitive element generating a light current depending on light incident thereto:

a pre-circuit connected to the photosensitive element for generating first and second separate basic signals in response to the light current generated by the photosensitive element; and first and second processing circuits connected to the pre-circuit and being active simultaneously for converting said first and second basic signals generated by the pre-circuit into first and second conversion-resultant signals having different forms respectively, and for outputting the first and second conversion-resultant signals to the control systems respectively.

2. A light sensing apparatus according to claim 1, wherein said pre-circuit comprises a current mirror circuit.

3. A light sensing apparatus for different control systems, comprising:
- a photosensitive element generating a light current depending on light incident thereto;
- a pre-circuit connected to the photosensitive element for generating separate basic signals in response to the light current generated by the photosensitive element; and
- processing circuits connected to the pre-circuit and being active simultaneously for converting said basic signals generated by the pre-circuit into conversion-resultant signals having different forms respectively, and for outputting the conversion-resultant signals to the control systems respectively;
- wherein at least one of the processing circuits comprises an oscillation circuit which oscillates at a frequency depending on related one of said basic signals generated by the pre-circuit.

4. A light sensing apparatus according to claim 3, wherein said one of the processing circuits which comprises the oscillation circuit further comprises a bias circuit for providing related one of said conversion-resultant signals with a predetermined offset.

5. A light sensing apparatus according to claim 3, wherein said one of the processing circuits which comprises the oscillation circuit further comprises a limiter circuit for clamping a condition of related one of said conversion-resultant signals when an illuminance related to said light is in a predetermined range.

6. A light sensing apparatus comprising:
- a photosensitive element generating a light current depending on light incident thereto; and
- an oscillation circuit connected to the photosensitive element for oscillation at a frequency depending on a magnitude of the light current generated by the photosensitive element, the oscillation circuit converting the light current into a frequency signal having a frequency depending on the light current magnitude.

7. A light sensing apparatus comprising:
- a photosensitive element generating a light current depending on light incident thereto;
- an oscillation circuit connected to the photosensitive element for oscillation at a frequency depending on the light current generated by the photosensitive element, the oscillation circuit converting the light current into a frequency signal having a frequency depending on the light current; and
- a bias current connected between the photosensitive element and the oscillation circuit for providing said frequency signal with a predetermined offset.

8. A light sensing apparatus comprising:
- a photosensitive element generating a light current depending on light incident thereto;
- an oscillation circuit connected to the photosensitive element for oscillation at a frequency depending on the light current generated by the photosensitive element, the oscillation circuit converting the light current into a frequency signal having a frequency depending on the light current; and
- a limiter circuit connected between the photosensitive element and the oscillation circuit for clamping the frequency of said frequency signal at a predetermined value when an illuminance related to said light is in a predetermined range.

* * * * *